United States Patent
Denny et al.

(10) Patent No.: US 8,365,250 B2
(45) Date of Patent: Jan. 29, 2013

(54) APPARATUS, METHODS, AND COMPUTER PROGRAM PRODUCTS FOR PROVIDING PORTABLE COMMUNICATION IDENTITY SERVICES

(75) Inventors: Michael S. Denny, Sharpsburg, GA (US); Hong Nguyen, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 998 days.

(21) Appl. No.: 11/969,396

(22) Filed: Jan. 4, 2008

(65) Prior Publication Data

US 2009/0178113 A1    Jul. 9, 2009

(51) Int. Cl.
*H04L 29/06* (2006.01)

(52) U.S. Cl. ............ 726/3; 726/1; 726/2; 726/4; 726/5; 726/26; 726/27; 726/28; 726/29; 726/30; 713/100; 713/182; 713/183; 713/185; 713/186; 709/201; 709/202; 709/203; 709/217; 709/219; 709/220; 709/221; 709/229

(58) Field of Classification Search ................... 726/1–5, 726/26–30; 713/182–186, 100; 709/201–203, 709/217–226; 715/744–747
See application file for complete search history.

(56) References Cited

U.S. PATENT DOCUMENTS

| | | | |
|---|---|---|---|
| 6,260,021 B1 * | 7/2001 | Wong et al. | 705/2 |
| 2003/0088647 A1 * | 5/2003 | ShamRao | 709/219 |
| 2004/0243691 A1 * | 12/2004 | Viavant et al. | 709/220 |
| 2006/0167985 A1 * | 7/2006 | Albanese et al. | 709/203 |

OTHER PUBLICATIONS

The Personal Server: Changing the Way We Think about Ubiquitous Computing by Want et al; Publisher: Springer-Verlag; Year: 2002.*

* cited by examiner

*Primary Examiner* — Taghi Arani
*Assistant Examiner* — Madhuri Herzog
(74) *Attorney, Agent, or Firm* — Cantor Colburn LLP

(57) ABSTRACT

Apparatus, methods, and computer program products for providing portable communication identity services are provided. A request is received to access a portable communication identity from a communications device. User information is received that is input by a user of the communications device, and the user information is authenticated. Capabilities of the communications device are accessed, and the portable communication identity is transmitted in accordance with the capabilities of the communications device.

19 Claims, 4 Drawing Sheets

APPARATUS, METHODS, AND COMPUTER PROGRAM PRODUCTS FOR PROVIDING PORTABLE COMMUNICATION IDENTITY SERVICES

BACKGROUND

Exemplary embodiments relate generally to providing portable communication identity services, and more particularly, to servers, methods, and computer program products for providing portable communication identity services.

Computing devices have become a part of our everyday world. Many people have cell phones, work computers, home computers, laptop computers, and the like. Each computing device may have various pieces of useful, personal information.

However, if a person goes to a different location, that person may not want to or be allowed to carry all of the different computing devices. It would be useful to be able to use a general-purpose computing device that is publicly available, e.g., at a hotel or on an airplane, as a personal computing device.

BRIEF SUMMARY

Exemplary embodiments include a method for providing portable communication identity services. A request is received to access a portable communication identity from a communications device. User information is received that is input by a user of the communications device, and the user information is authenticated. Capabilities of the communications device are accessed, and the portable communication identity is transmitted in accordance with the capabilities of the communications device.

Additional exemplary embodiments include a server for providing portable communication identity services. A processor executes instructions to control the server configured to provide a portable communication identity. The server is operatively connected to a communications device via a network. An input receives a request for the portable communication identity, and the processor authenticates the request for the portable communication identity and assesses capabilities of the communications device. An output transmits the portable communication identity to the communications device based on the capabilities of the communications device.

Further exemplary embodiments include a computer program product, tangibly embodied on a computer readable medium, for providing portable communication identity services. The computer program product includes instructions for causing a computer to execute the above method.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Figure 1:
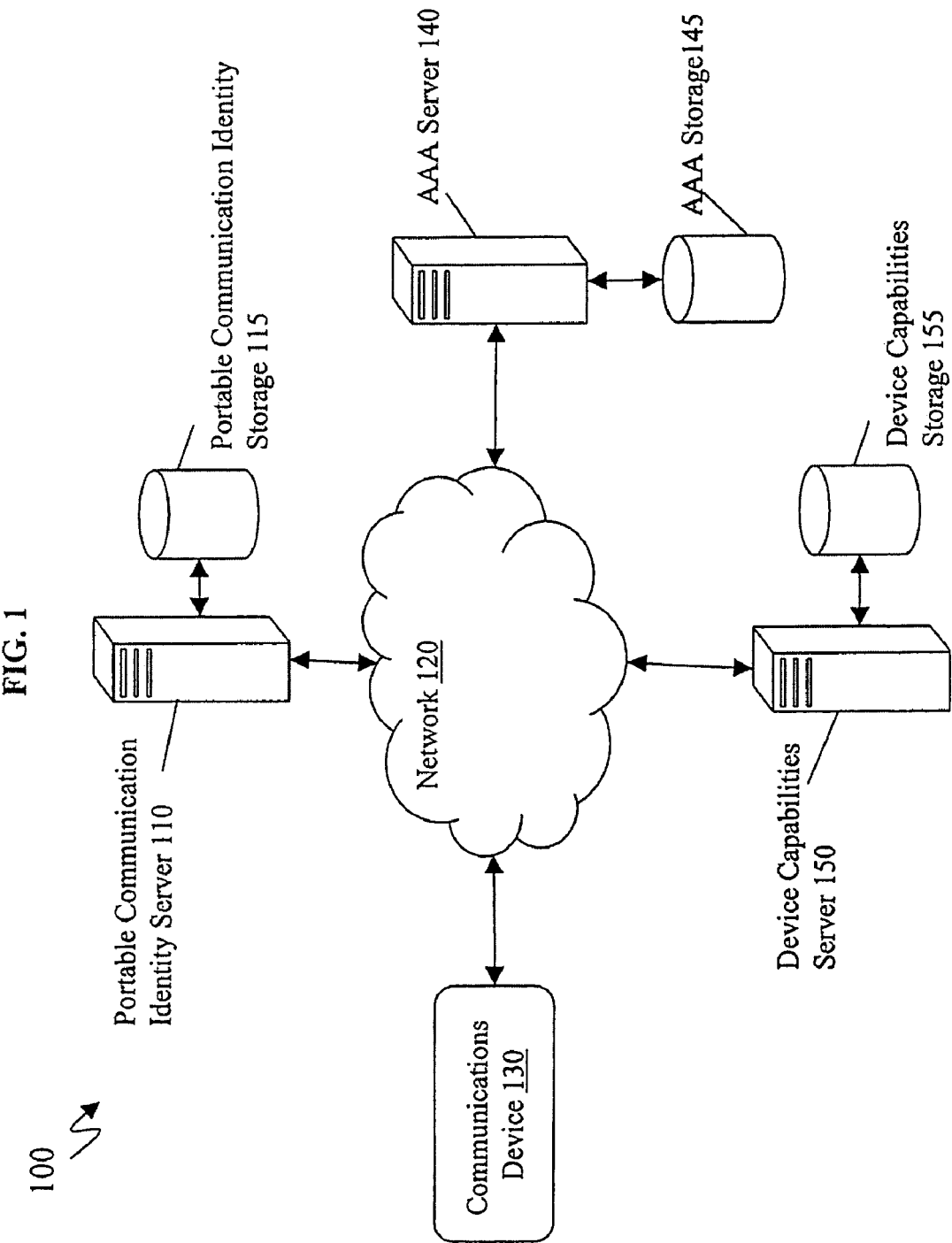
FIG. 1 illustrates a system for providing portable communication identity services in accordance with exemplary embodiments.

FIG. 1 illustrates a system for providing portable communication identity services in accordance with exemplary embodiments. A system 100 includes servers, such as a portable communication identity server 110 configured to provide portable communication identity services. The portable communication identity server 110 may be operatively connected to a portable communication identity storage 115 and to at least one or more communications devices, such as a communications device 130, over a network 120. It is understood that in exemplary embodiments and implementations, the communications device 130 can be a variety of communications devices, such as general purpose or laptop computers, or wireless devices such as cellular telephones, portable computing device, personal digital assistant (PDA), and digital music players (e.g., MP3 players).

The network 120 may include circuit-switched and/or packet-switched technologies and devices, such as routers, switches, hubs, gateways (e.g., residential gateways, including a DSL or cable modem), or IP multimedia subsystem (IMS)-based networks for facilitating communications among the communications device 130, the portable communications identity server 110, an Authentication, Authorization, Accounting (AAA) server 140 that may be operatively coupled to an AAA storage 145, and a device capabilities server 150 that may be operatively coupled to a device capabilities storage 155. The network 120 may include wireline and/or wireless components utilizing, e.g., IEEE 802.11 standards for providing over-the-air transmissions of communications. In addition, a wireline public switched telephone network (PSTN) telephone, Session Initiation Protocol (SIP) telephone, dual-mode mobile telephone, or other type of communications device may be included in the system 100 of FIG. 1.

In exemplary embodiments, the network 120 can be a managed IP network administered by a service provider, which can control bandwidth and quality of service for the communications discussed herein. The network 120 may be implemented in a wireless fashion, e.g., using wireless protocols and technologies, such as WiFi, WiMax, and BLUETOOTH. The network 120 can also be a packet-switched network as a local area network, wide area network, metropolitan area network, Internet network, or other similar type of network environment. The network 120 may be a cellular communications network a fixed wireless network, a wireless local area network (LAN), a wireless wide area network (WAN), a personal area network (PAN), a virtual private network (VPN), an intranet or other suitable network system, and the network 120 includes equipment for receiving and transmitting signals such as a cell tower and mobile switching center. In exemplary embodiments, the network 120 can also be a circuit-switched network, such as a standard public switched telephone network (PSTN).

According to exemplary embodiments, the network 120 may facilitate transmission of images, video, data, audio, downloads, configurations, address books, contacts. etc. from the portable communication identity server 110 to the communications device 130 in accordance with the portable communication identity service The portable communication identity server 110, the AAA server 140, and the device capabilities server 150 may be implemented using a high-speed processing device (e.g., a computer system) that is capable of handling high volume activities conducted via the communications device 130 and other network entities via the network 120.

The system 100 can manage multiple accounts and subscriptions as established by particular users of the system 100. These accounts may then be used to provide access to the portable communication identity services as described further herein. According to exemplary embodiments, the portable communication identity server 110 may receive requests from the communications device 130, e.g., to establish a portable communication identity services account or to access portable communication identity services. The portable communication identity server 110 or the AAA server 140 may implement authentication software for restricting and/or controlling access to the portable communication identity services provided by the portable communication identity server 110. The portable communication identity server 110 or the AAA server 140 may implement a customer identity system (CIS), which stores user credentials (e.g., usernames, preferences, and passwords). Also, the portable communication identity server 110 may implement portable communication identity service logic for operatively connecting to the communications device 130 to provide the portable communication identity services. As non-limiting examples, numerous communications devices, such as the communications device 130, may be operatively connected to the portable communication identity server 110. The portable communication identity server 110 may be configured to control the operations and functions of the portable communication identity services.

In exemplary embodiments, a user may have access to a general-purpose computer, such as the communications device 130. For example, the general-purpose computer may be in a hotel, a mall, an airport, a store, or a home of a friend. However, the functionality, applications, configurations, desktop setup, etc. of the user are not present on the communications device 130. The user may desire to utilize the portable communication identity services to access his portable communication identity, which may be stored on the portable communications identity server 110 or the portable communication identity storage 115. The user may input a username, password, code, and/or identification, and the portable communication server 110 (or the AAA server 140) authenticates the user. The user can input the capabilities of the communications device 130, or the portable communication identity server 110 may be given permission to scan the communications device 130 so as to determine the capabilities of the communications device 130. As a non-limiting example, the portable communication identity server 110 may remotely connect to the communications device 130 to assess the capabilities of the communications device 130 by, e.g., performing scans, checking memory capacity, checking processing capacity, checking for the type of audio card, checking for the type of video card, checking the type of buss, etc. As a non-limiting example, the portable communication identity server 110 may utilize a device interrogation protocol for determining the capabilities of the communication device 130. The device interrogation protocol may be similar to, e.g., the ease of operation of a plug and play (PNP) system. Also, the capabilities information of the communications device 130 and other computing devices may be stored on the device capabilities server 150 or the device capabilities storage 155. The device capabilities server 150 may store and identify the capabilities of various computing devices at various locations. The device capabilities server 150 may contain the capabilities of the communications device 130 and can transmit the capabilities of the communications device 130 to the portable communications identity server 110.

Use of the term capabilities refers to the computer specifications and performance of the computing device and can be related to software, firmware, hardware, or some combination thereof. As non-limiting examples, the capabilities may be related to an operating system, central processing unit (CPU), clock speed, bus speed, cache, memory (including random access memory (RAM)), peripherals, application programming interface (API), drivers, adapters, internet connection, video cards, sound cards, etc.

In response to receiving the capabilities of the communications device 130, the portable communication identity server 110 identifies the elements of the portable communication identity that are compatible with the communications device 130 and transmits those elements of the portable communication identity of the user to the communications device 130. The portable communications identity server 115 can configure the communications device 130 in accordance with the portable communication identity of the user. For example, if the portable communication identity includes a subscription to a game or gaming service that is not compatible with the capabilities of the communication device 130 (e.g., if the game requires more memory than the communication device 130 possesses), then this element of the portable communication identity would not be transmitted to the communications device 130. In exemplary embodiments, the portable communication identity server 110 may transmit a menu (similar to an example menu 300 shown in FIG. 3). The menu may contain various items (elements) of the portable communication identity of the user. The user may select items from the menu to be transmitted to or configured on the communications device 130. As a non-limiting example, having such an option with a menu may be useful if the capabilities of the communications device 130 cannot support the entire portable communication identity of the user. For example, the capabilities of the communications device 130 may be able to support certain applications, but not others. For example, some network games may require sophisticated processing to be done in the communications device 130, thus requiring the communications device 130 to contain a minimum amount of memory or support hardware processing, such as video capture using a built-in camera. Also, in exemplary embodiments, the user may access the menu items without the portable communication identity server 110 receiving device capabilities, and the user may select the items that he desires to be provided by the portable communications identity server 110 to the communications device 130.

When the communications device 130 receives the portable communication identity or the selection of items of the portable communications identity, the user can utilize the added features of the communications device 130. In accordance with the portable communication identity of the user, the communications device 130 may be configured to provide the same operability, e.g., as the user's home computer, home phone, cell phone, PDA, or the like. As a non-limiting example, the user may be in a hotel and needs to use the communication device 130, such as a cell phone of the hotel. However, the user needs to access his contacts and address book, which are contained in the user's portable communication identity. The user may be authenticated by the portable communications server 110 and select to have his contacts and address book configured on the cell phone of the hotel. Once the portable communication identity server 110 has completed the configurations to the cell phone of the hotel, the user can utilize the contacts and address book, now on the cell phone of the hotel, that have been provided by the portable communication identity server 110. The portable communications identity service allows the user to travel anywhere without bringing equipment and allows the user to utilize the facilities of the communications device 130 (which may be located in a hotel, a mall, or an airplane) as though he were using his own personal device. Although the communications device 130 may be general in nature, using the personal communication identity of the user allows the communications device 130 to be converted into a personal communications device for the user.

In the exemplary embodiments, various configurations may be uploaded to the portable communications identity server 110 to be contained in the user's portable communication identity. As a non-limiting example, the user's portable communication identity may in some ways resemble a user profile in that the user can control what is contained in his portable communication identity. The user may have various configurations on various devices, such as on a home computer, a cell phone, a home phone, a work computer, a gaming system, etc. The portable communication identity server 110 is adapted to upload the various configurations of the various devices into the portable communication identity of the user. Any information that has been populated in the portable communication identity of the user is immediately available on the portable communication identity server 110 coupled to the portable communication identity storage 115. In the upload of the user's portable communication identity, device menus and device application configuration information may be included. The application configuration information may include operating system requirements, memory requirements, and disk requirements. In exemplary embodiments, the application configuration information could be an application identifier that is mapped by the portable communication identity server 110 to an application profile containing system requirements, memory requirements, and disk requirements which are stored on the portable communication identity server 110.

In accordance with exemplary embodiments, it is understood that the operations and functionality of the portable communication identity server 110 may be implemented in a portable communication identity application that is stored on the portable communication identity server 110.

It is understood that the exemplary embodiments are not limited to but are capable of being implemented in the system 100 illustrated in FIG. 1. Additionally, the portable communication identity server 110, the AAA server 140, and the device capabilities server 150 may be representative of numerous, varied servers. The portable communication identity storage 115, the AAA storage 145, and the device capabilities storage 155 may be representative of numerous, varied storages devices. Likewise, the network 120 may be representative of numerous, varied networks. Also, the communications device 130 may be representative of numerous, varied communications devices. Therefore, the system 100 illustrated in FIG. 1 is neither limited numerically to the elements depicted therein nor limited to the exact configuration and operative connections of elements. Further, it is understood by those skilled in the art that elements may be added to, subtracted from, or substituted for the elements described in the system 100 of FIG. 1.

Additionally, the elements, devices, network entities, etc., discussed herein all contain the necessary software and hardware components to function as described, which include but are not limited to processors, memory, input/output devices, buses, software applications, etc.

Figure 2:
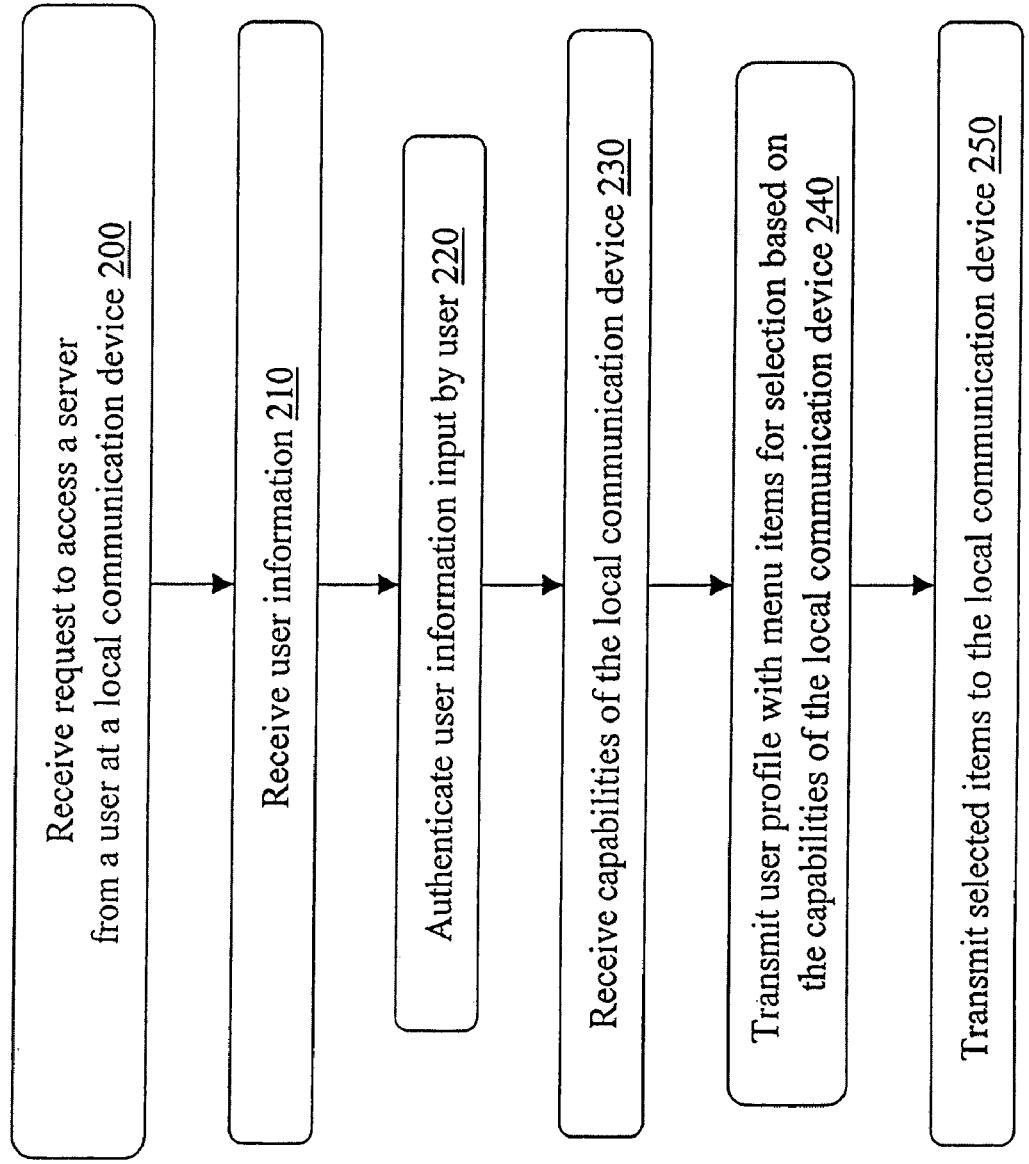
FIG. 2 illustrates a method for providing portable communication services in accordance with exemplary embodiments.

FIG. 2 illustrates a method for providing portable communication services in accordance with exemplary embodiments. The portable communication identity server 110 receives a request from the user of the communications device 130 to access portable communication identity services at 200. The portable communications identity server 110 receives user information, such as a username, password, and/or code for accessing the portable communication identity services of the portable communication server 110 at 210. The user information is authenticated by the portable communication identity server 110 or the AAA server 140 at 220.

The capabilities of the communications device 130 are received by the portable communication identity sever 110 at 230. As non-limiting examples, the capabilities of the communications device 130 may be retrieved from the device capabilities server 150, where the device capabilities server 150 and/or the device capabilities storage 155 comprise capabilities for a plurality of devices that are uniquely identified. Also, the communications device 130 may be scanned by the portable communications identity server 150 to determine the capabilities of the communications device 130. For example, the portable communication identity server 110 may utilize the device interrogation protocol to assess the capabilities of the communications device 130. Further, the user may transmit the capabilities of the communications device 130 to the portable communication identity server 110.

The portable communication identity server 110 may transmit a menu of items for selection based on the capabilities of the communications device 130 at 240. Also, the portable communication identity server 110 may make the menu of items available to the user whether or not the portable communication identity server 110 receives the capabilities of the communications device 130.

In response to receiving the selection of items of the menu, the portable communication identity server 110 provides the selected items to the communication device 130 at 250. Also, the portable communication identity server 110 may provide the portable communication identity of the user to the communications device 130 at any point that the user makes a request for his portable communication identity without having to transmit the menu. The menu of items is not meant to be limiting but to allow the user added flexibility in deciding which items from the portable communication identity are needed. Additionally, the portable communication identity server 110 may provide the portable communication identity to the communications device 130 without the user having to make selections from the menu of items. As a non-limiting example, the communications device 130 may be a new, up-to-date computer that is capable of handling the entire portable communication identity of the user, and there is no need to determine the capabilities of the new computer.

Figure 3:
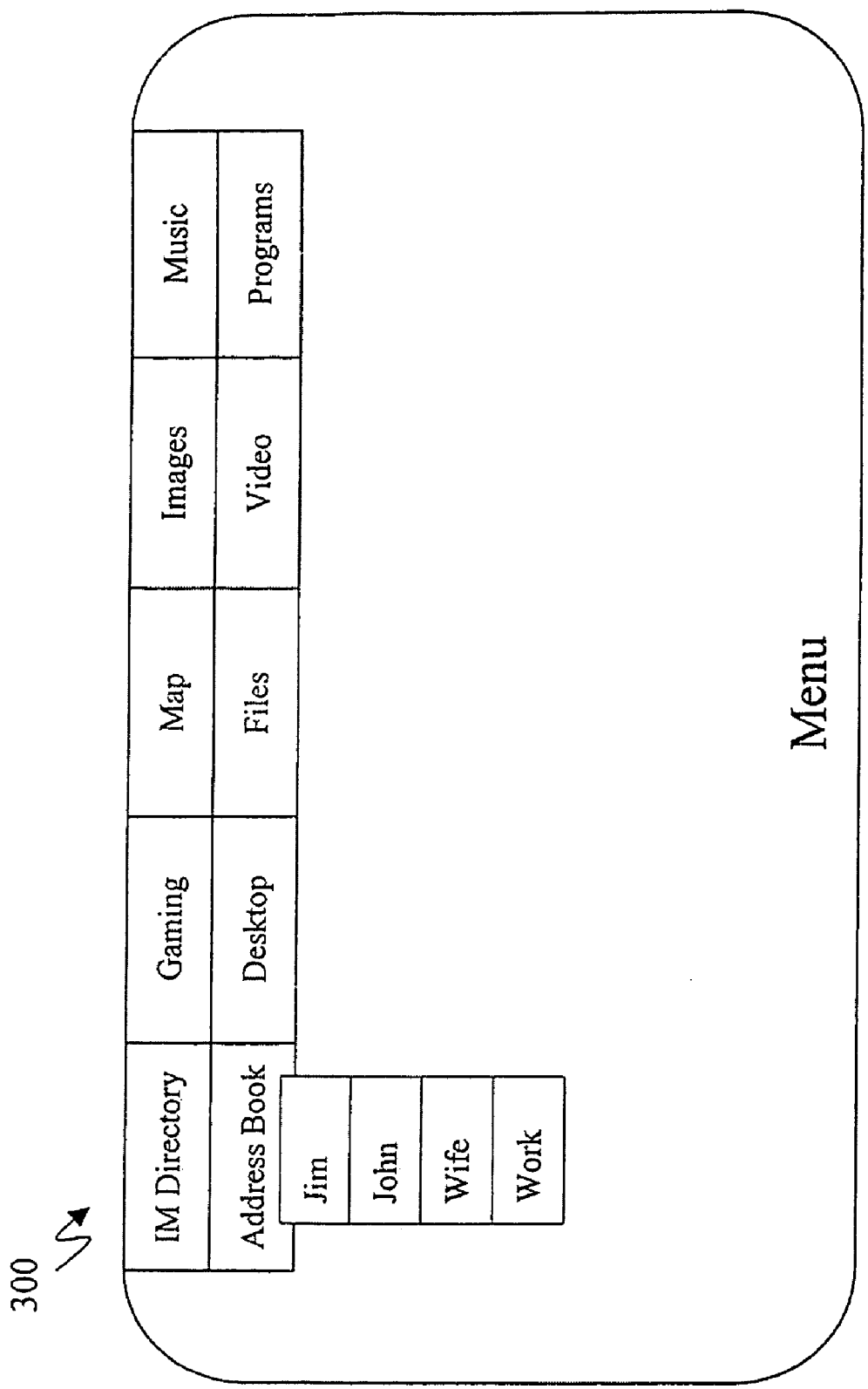
FIG. 3 illustrates an example of a menu that can be provided by the portable communication identity server in accordance with exemplary embodiments.

FIG. 3 illustrates an example of the menu 300 that can be provided by the portable communication identity server 110 in accordance with exemplary embodiments. Among the many ways that portions or the entire portable communication identity of the user may be provided to the communications device 130, the menu 300 may be used. The menu 300 may include various items that can be selected by the user to be transmitted from the portable communication identity server 110 to the communications device 130. By way of non-limiting menu 300 items for selection by the user, the menu 300 may include such items as an instant messaging (IM) directory, gaming, maps, images, music, address book, desktop, files, video, and programs. Each item in the menu 300 may be selected for download, or the item may expand to show further options. As a non-limiting example, the address book may be expanded, and a listing of names can be provided to the user. In exemplary embodiments, it is understood that the portable communication identity must be populated in advance by the user, such that the portable communication identity is available for use.

Figure 4:
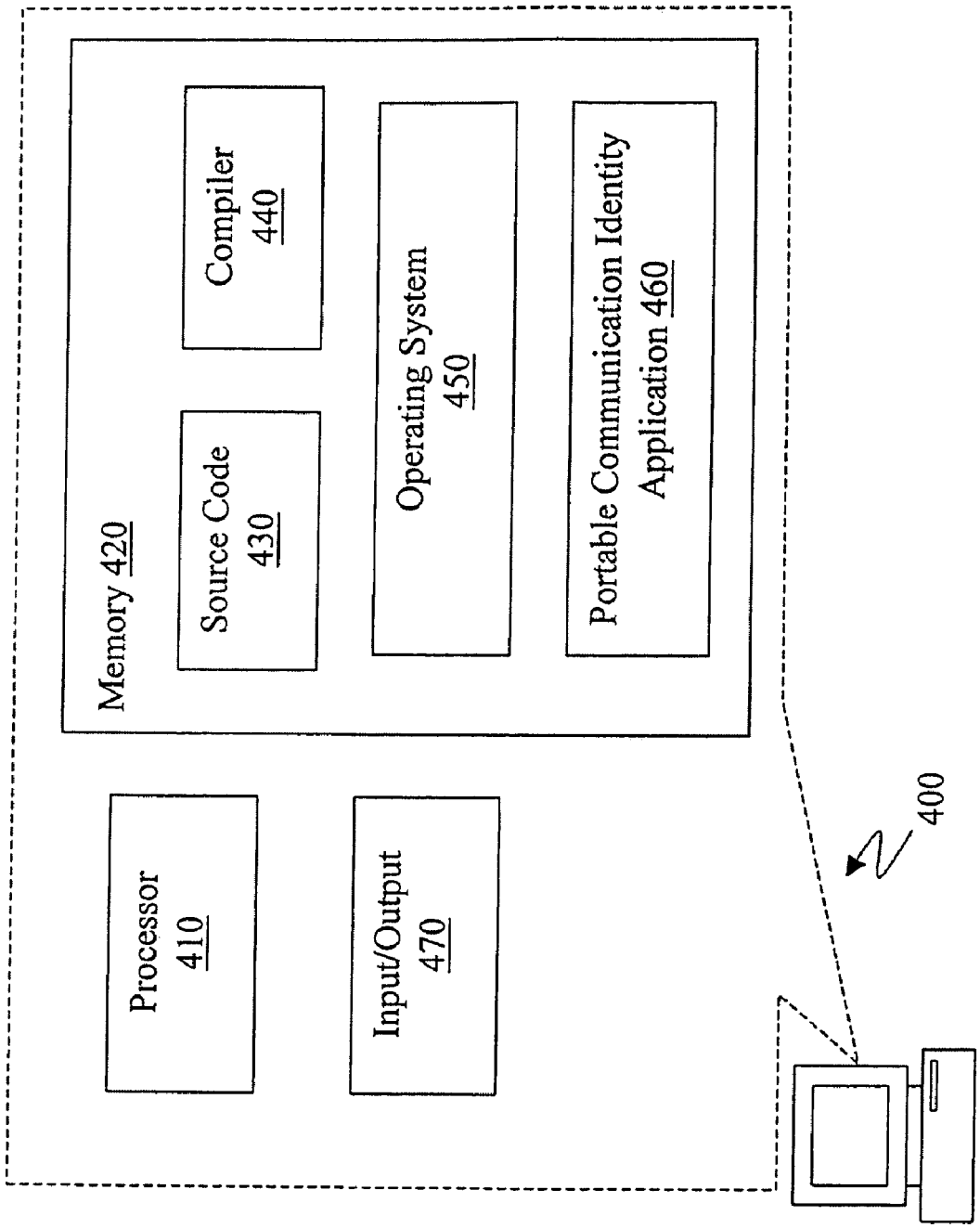
FIG. 4 illustrates an example of a computer in which a portable communication identity application may be implemented for providing portable communication identity services in accordance with exemplary embodiments.

FIG. 4 illustrates an example of a computer 400 in which a portable communication identity application may be implemented for providing portable communication identity services in accordance with exemplary embodiments. The exemplary embodiments may be implemented in computer program products in the computer 400. The computer 400 includes, but is not limited to, PCs, workstations, laptops, PDAs, palm devices, servers (such as the portable communication identity sever 110), and the like. Generally, in terms of hardware architecture, as shown in FIG. 4, the computer 400 may include a processor 410, memory 420, and one or more input and/or output (I/O) 470 devices (or peripherals) that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 410 is a hardware device for executing software that can be stored in the memory 420. The processor 410 can be virtually any custom made or commercially available processor, a central processing unit (CPU), a data signal processor (DSP), or an auxiliary processor among several processors associated with the computer 400, and the processor 410 may be a semiconductor based microprocessor (in the form of a microchip) or a macroprocessor.

The memory 420 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 420 may incorporate electronic, magnetic, optical, and/or other types of storage media. Note that the memory 420 can have a distributed architecture, where various components are situated remote from one another, but can be accessed by the processor 410.

The software in the memory 420 may include one or more separate programs, each of which comprises an ordered listing of executable instructions for implementing logical functions. In the example illustrated in FIG. 4, the software in the memory 420 includes a suitable operating system (O/S) 450, compiler 440, source code 430, and a portable communication identity application 460 of the exemplary embodiments. As illustrated, the portable communication identity application 460 comprises numerous functional components for implementing the features and operations of the exemplary embodiments.

The operating system 450 essentially controls the execution of other computer programs, and provides scheduling, input-output control, file and data management, memory management, and communication control and related services. It is contemplated by the inventors that the portable communication identity application 460 for implementing portable communication identity services according to exemplary embodiments is applicable on all other commercially available operating systems.

The portable communication identity application 460 may be a source program, executable program (object code), script, or any other entity comprising a set of instructions to be performed. When a source program is to be executed, then the program is usually translated via a compiler (such as the compiler 440), assembler, interpreter, or the like, which may or may not be included within the memory 420, so as to operate properly in connection with the O/S 450. Furthermore, the portable communication identity application 460 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, NET, and the like.

The I/O 470 devices may include input devices such as, for example but not limited to, a mouse, keyboard, scanner, microphone, etc. Furthermore, the I/O 470 devices may also include output devices, for example but not limited to, a printer, display, etc. Finally, the I/O 470 devices may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc.

If the computer 400 is a PC, workstation, server, intelligent device or the like, the software in the memory 420 may further include a basic input output system (BIOS) (omitted for simplicity). The BIOS is a set of essential software routines that initialize and test hardware at startup, start the O/S 450, and support the transfer of data among the hardware devices. The BIOS is stored in some type of read-only-memory, such as ROM, PROM, EPROM, EEPROM or the like, so that the BIOS can be executed when the computer 400 is activated.

When the computer 400 is in operation, the processor 410 is configured to execute software stored within the memory 420, to communicate data to and from the memory 420, and to generally control operations of the computer 400 pursuant to the software. The portable communication identity application 460 and the O/S 450 are read, in whole or in part, by the processor 410, perhaps buffered within the processor 410, and then executed.

When the portable communication identity application 460 is implemented in software, as is shown in FIG. 4, it should be noted that the portable communication identity application 460 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The portable communication identity application 460 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the portable communication identity application 460 is implemented in hardware, the portable communication identity application 460 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Although the exemplary embodiments described above are directed to portable communication identity services, it should be appreciated that the invention is not restricted to applications for these services. Rather, the invention may be applicable for providing access to other services.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for providing portable communication identity services, comprising:
   receiving a request to access a portable communication identity from a communications device;
   receiving user information input by a user of the communications device;
   authenticating the user information;
   accessing capabilities of the communications device by a server remotely connecting to the communications device to remotely scan hardware of the communications device in order to obtain hardware specifications of the communications device and in order to identify elements of the portable communication identity that are compatible with the capabilities of the communications device;
   displaying a gaming tab for the user to select in a menu for the portable communication identity, the gaming tab being populated in advance in the portable communication identity by the user;
   including a subscription to a gaming service in the portable communication identity;
   based on the subscription to the gaming service in the portable communication identity being incompatible with the communications device, preventing the subscription to the gaming service from being transmitted to the communications device;
   wherein the elements of the portable communication identity comprise a gaming application and a gaming configuration; and
   transmitting to the communications device the portable communication identity comprising the gaming application and the gaming configuration in accordance with the hardware specifications of the communications device obtained from the server remotely scanning the hardware of the communications device.

2. The method of claim 1, further comprising remotely scanning the communications device to obtain a type of video card, a type of audio card, and a type of bus for the communications device.

3. The method of claim 2, wherein the capabilities of the communications device are received from a device capabilities server that stores device capabilities for a plurality of communications devices.

4. The method of claim 1, wherein the capabilities of the communications device comprise computer specifications of the communications device.

5. The method of claim 1, further comprising transmitting the menu of items as selections to be downloaded, wherein the menu of the items is contained in the portable communication identity.

6. The method of claim 5, wherein in response to receiving selected items of the menu of the items, the selected items are transmitted to the communications device.

7. The method of claim 1, wherein the portable communication identity is a desktop of the user.

8. The method of claim 1, further comprising configuring the communications device in accordance with the portable communications identity of the user.

9. A server for providing portable communication identity services, comprising:
 a processor executing instructions for providing a portable communication identity;
 an input receiving a request for the portable communication identity from a communications device over a network;
 the processor authenticating the request for the portable communication identity;
 the processor assessing capabilities of the communications device by remotely connecting to the communications device to remotely scan hardware of the communications device in order to obtain hardware specifications of the communications device and in order to identify elements of the portable communication identity that are compatible with the capabilities of the communications device;
 the processor displaying a gaming tab for the user to select in a menu for the portable communication identity, the gaming table being populated in advance in the portable communication identity by the user;
 the processor, based on the subscription to the gaming service in the portable communication identity being incompatible with the communications device, preventing the subscription to the gaming service from being transmitted to the communications device;
 wherein the elements of the portable communication identity comprise a gaming application and a gaming configuration; and
 an output transmitting the portable communication identity comprising the gaming application and the gaming configuration to the communications device based on the hardware specifications of the communications device obtained from the processor remotely scanning the hardware of the communications device.

10. The server of claim 9, wherein the processor receives the capabilities of the communications device.

11. The server of claim 10, wherein the processor receives the capabilities of the communications device from a device capabilities storage which stores capabilities of a plurality of communications devices.

12. The server of claim 9, wherein the output transmits the menu of items as selections for download by the communications device, the menu of the items being contained in the portable communication identity.

13. The server of claim 12, wherein in response to receiving selected items of the menu of the items, the selected items are transmitted by the output to the communications device.

14. The server of claim 9, wherein the capabilities of the communications device comprise computer specifications of the communications device.

15. The server of claim 9, wherein the processor configures the communications device in accordance with the portable communications identity.

16. A computer program product, tangibly embodied on a non-transitory computer readable medium, for providing portable communication identity services, the computer program product including instructions for causing a server to execute a method, comprising:
 receiving a request to access a portable communication identity from a communications device;
 receiving user information input by a user of the communications device;
 authenticating the user information;
 accessing capabilities of the communications device by the server remotely connecting to the communications device to remotely scan hardware of the communications device to obtain hardware specifications of the communications device and in order to identify elements of the portable communication identity that are compatible with the capabilities of the communications device;
 displaying a gaming tab for the user to select in a menu for the portable communication identity, the gaming tab being populated in advance in the portable communication identity by the user;
 including a subscription to a gaming service in the portable communication identity;
 based on the subscription to the gaming service in the portable communication identity being incompatible with the communications device, preventing the subscription to the gaming service from being transmitted to the communications device;
 wherein the elements of the portable communication identity comprise a gaming application and a gaming configuration; and
 transmitting to the communications device the portable communication identity comprising the gaming application and the gaming configuration in accordance with the hardware specifications of the communications device obtained from remotely scanning the hardware of the communications device.

17. The computer program product of claim 16, wherein the capabilities of the communications device are received from a device capabilities server that stores device capabilities for a plurality of communications devices.

18. The computer program product of claim 16, further comprising instructions for causing the computer to execute transmitting the menu of items as selections to be downloaded, wherein the menu of the items is contained in the portable communication identity.

19. The computer program product of claim 18, wherein in response to receiving selected items of the menu of the items, the selected items are transmitted to the communications device.

* * * * *